(12) United States Patent
Novorita et al.

(10) Patent No.: US 6,741,874 B1
(45) Date of Patent: May 25, 2004

(54) METHOD AND APPARATUS FOR REDUCING ECHO FEEDBACK IN A COMMUNICATION SYSTEM

(75) Inventors: Robert Novorita, Orland Park, IL (US); Eric Ziolko, Schaumburg, IL (US); Gary Grube, Barrington, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/552,466

(22) Filed: Apr. 18, 2000

(51) Int. Cl.[7] .............................. H04Q 7/20; H04Q 7/32
(52) U.S. Cl. .................. 455/570; 455/550.1; 455/517; 379/406.01; 379/406.02; 379/406.03; 379/406.06; 379/388.07; 370/282; 370/286; 370/289; 370/288
(58) Field of Search ............................. 455/570, 550.1, 455/517, 422.1, 426.1, 403; 379/406.01, 406.02, 406.05, 406.07, 390.02, 392.01, 406.03, 406.04, 406.06, 406.08, 406.09, 406.1, 406.11, 406.12, 406.13, 406.14, 406.15, 406.16, 388.04, 388.07; 370/282, 286, 289, 288, 287; 381/318

(56) References Cited

U.S. PATENT DOCUMENTS

| | | | | |
|---|---|---|---|---|
| 5,027,393 A | * | 6/1991 | Yamamura et al. | 379/406.06 |
| 5,664,019 A | * | 9/1997 | Wang et al. | 381/71.1 |
| 6,363,344 B1 | * | 3/2002 | Higuchi | 704/226 |
| 6,442,272 B1 | * | 8/2002 | Osovets | 379/406.01 |
| 6,583,806 B2 | * | 6/2003 | Ludwig et al. | 348/14.08 |

* cited by examiner

Primary Examiner—William Trost
Assistant Examiner—Keith Ferguson
(74) Attorney, Agent, or Firm—Susan L. Lukasik; Valerie M. Davis

(57) ABSTRACT

A method and apparatus for reducing echo feedback in a wireless communication system (10) is accomplished when a receiving communication unit (24) senses a feedback signal, or echo, via an ancillary communication path. The receiving communication unit is a targeted recipient of an original audio signal generated by a transmitting communication unit (22), where the original audio signal (42) is conveyed to the receiving communication unit. Upon detecting the feedback signal and determining that it exceeds a feedback threshold, the receiving communication unit attenuates an audible output of the original signal to reduce echo to the transmitting communication unit. In addition, the receiving communication unit, and/or the transmitting communication unit include echo canceller to further minimize the echo within the digital communication system.

17 Claims, 5 Drawing Sheets

METHOD AND APPARATUS FOR REDUCING ECHO FEEDBACK IN A COMMUNICATION SYSTEM

TECHNICAL FIELD OF THE INVENTION

The present invention relates generally to communication systems and more particularly to echo cancellation within communication systems.

BACKGROUND OF THE INVENTION

Wireless communication systems are known to include a plurality of communication units and wireless infrastructure. The communication units, which include mobile radios, portable radios, cellular telephones, personal digital assistants, computers with wireless modems, and so forth, communicate with each other via the wireless infrastructure. The wireless infrastructure includes communication resources, such as wireless communication channels and control channels, base stations, base station controllers, and mobile switching centers. The base stations are distributed throughout a geographical region to provide wireless coverage for that region. The base stations are often coupled to a base station controller that coordinates communications within that region. Base station controllers within various regions are typically coupled to the mobile switching center that coordinates communications throughout the plurality of regions.

Once a communication is established in a digital wireless communication system, a communication unit receives an audible input signal, e.g., speech, from its user. The communication unit encodes the audible input signal into a vocoded digital format, such as IMBE (Improved Multi-Band Excitation), and transmits the vocoded digital signal to the wireless infrastructure. The wireless infrastructure processes the received vocoded digital signal and provides the processed signal to the appropriate target communication units, i.e., the communication units that were intended to receive the communication. In today's digital wireless communication systems, the processing of received vocoded digital signals takes a few hundred milliseconds to well over a second to process and provide to the target communication units.

If the originating communication unit, i.e., the communication unit receiving the audible input, is in close physical proximity to one of the target communication units, audio feedback, also known as an echo, may occur. In close physical proximity, the microphone of the originating communication unit may receive the audible output from the target communication unit, thereby producing an echo. Because the microphone cannot distinguish between the original audible signal and the processed audible signal, the communication unit processes both in the same manner. As a result, all of the communication units involved in the communication hear the echo. In addition to the echo created by the equipment, the operator of the initiating communication unit hears the audible output of the targeted communication unit, which output occurs a noticeable time after the originate audible input signal was created. Such feedback can be quite distracting to the talking user as well as the listening users.

Currently, digital wireless communication systems do not incorporate echo cancellation circuitry to overcome the above mentioned problems. There are, however, echo cancellation circuits used in connection with telephony. Such echo cancellation is derived for electrical audio reflections, which are generated by mismatches and imperfections when converting four wire audio, e.g., from an isolated receiver/transmitter system, to a two-wire, full-duplex circuit, such as a telephone line. Such echo cancellation circuits may be either passive or dynamic. Passive echo cancellation is performed in a two-to four-wire hybrid combiner by way of phase inversion on the receiving path. The phase inversion cancels the audio energy that would otherwise be reflected back on the four-wire received port. Newer digital signal processing technologies enable the passive echo cancellation capabilities to be extended to variable processing, thereby providing dynamic echo cancellation. Dynamic echo cancellation circuits estimate the reflective delay and combines or subtracts a delayed version of the transmitted source audio, thus removing the echo component. While both implementations solve the problem in the time domain by performing wave form subtraction to remove the undesired electrical reflective audio, such echo cancellation circuits do not address the longer delay that occurs in a digital wireless communication system.

Therefore, a need exists for a method and apparatus that performs echo cancellation and/or attenuation in a digital wireless communication system.

DETAILED DESCRIPTION OF A PREFERRED EMBODIMENT

Generally, the present invention provides a method and apparatus for reducing echo feedback, particularly useful in a wireless communication system. The echo feedback reduction is accomplished by a receiving communication unit sensing a feedback signal via an ancillary communication path. The receiving communication unit is a targeted recipient of an original audio signal generated by a transmitting communication unit, where the original audio signal is conveyed to the receiving communication unit via a wireless infrastructure. The feedback signal, or echo, is representative of the original audio signal and is produced as a result of close physical proximity of the transmitting and receiving communication units. Upon detecting the feedback signal and determining that it exceeds a feedback threshold, the receiving communication unit attenuates an audible output of the original signal to reduce the echo feeding back to the transmitting communication unit. In addition, the receiving communication unit, and/or the transmitting communication unit may also include echo cancellation functionality to further minimize the echo within the digital communication system. With such a method and apparatus, echo signals that result because of the close physical proximity of a transmitting communication unit to a receiving communication unit are substantially reduced, thereby substantially eliminating the undesired affects of the echo signals.

Figure 1:
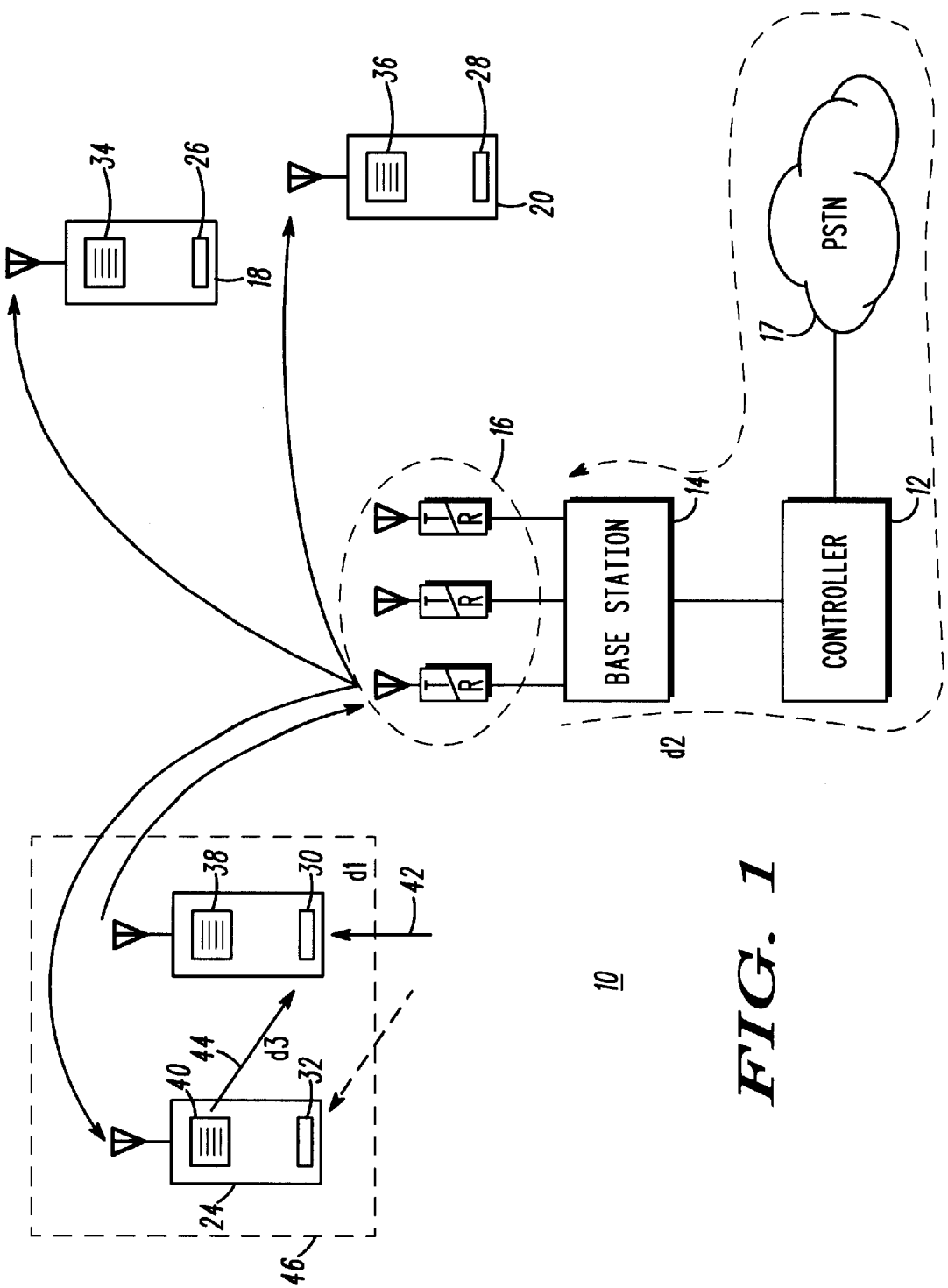
FIG. 1 illustrates a block diagram of a communication system in accordance with the present invention.

FIG. 1 illustrates a block diagram of a communication system 10 that includes a controller 12, a base station 14, a plurality of wireless transceivers 16, and a plurality of communication units 18, 20, 22, and 24. The controller 12 may be a base station controller and/or a mobile switching center. The controller 12 is shown coupled to a public switched telephone network (PSTN) 17. By having the controller coupled to the PSTN 17, communication units 18, 20, 22, and 24 affiliated with the communication system 10 may access traditional telephone wireline services. Note that the controller 12 and the base station 14 comprise at least a part of the infrastructure. As one of average skill in the art readily appreciates, a wireless infrastructure may include additional controllers and base stations, as well as other connections to public communication infrastructures, such as the Internet, and/or private communication systems as well. Although the present invention is described primarily as applied to a wireless communication system, one of skill in the art would appreciate that the present invention also provides benefit to wireless systems as well as combined wireline and wireless systems. Although the present invention is described with respect to digital signals, the invention would be successfully practiced with analog signals.

Each of the communication units 18, 20, 22, and 24 includes a microphone 26, 28, 30, and 32 and a speaker 34, 36, 38, and 40. The communication units may be mobile radios, portable radios, cellular telephones, personal digital assistants, cellular telephones, personal computers equipped with a wireless modem, and/or any other device that transceives information to at least one other communication unit via a wireless communication path. When the invention is applied within a wireline communication system, the communication units are typical wireline communication units, such as wireline telephones and cordless telephones. Communication unit 22 and communication unit 24 are shown within a proximal location 46, e.g., within a few meters of each other, within the same room, or within audio reception distance. In the close proximal area 46, the audible output 44 of the first communication unit 24 is received by the ear of the operator of communication unit 22 and by the microphone 30, thereby producing the echo problem, i.e., the operator hearing a delayed representation of his/her voice and an echo signal being propagated through the wireless communication system.

The delayed representation of the original audible signal 42 results from the delay between when the words were spoken until received by the communication unit 22, d1, the processing delay of the infrastructure, d2, and the propagation from the speaker of communication unit 24 to the operator's ear. The spoken delay d1 is a relatively short time, e.g., less than a few milliseconds, because the source for the audible input signal, e.g., the operator of the communication unit 22, travels at the speed of sound and is a short distance from the microphone 30. Similarly, the last delay d3 is relatively short since the operator's ear is short distance from the speaker of communication unit 24. Thus, the majority of the delay comes from the processing time of the infrastructure, which is designated d2. The infrastructure processing includes receiving a processed audible input signal from communication unit 22, and providing the signal to the target communication units, e.g., members of a communication group. Such processing takes the infrastructure a few hundred milliseconds to over a second to complete. Thus, the audible output 44 is delayed by at least a few hundred milliseconds, d1+d2+d3, which is noticeable to the human ear.

To substantially overcome the noticeable feedback or echo, the communication unit 24 attenuates its output, i.e., the audible output 44 when the echo or feedback signal is detected. The attenuation may vary depending on the strength of the echo or feedback signal, but is sufficient to substantially make the audible output 44 practically unheard by the operator of communication unit 22. Thus, the problem of the operator hearing a delayed representation of his/her voice is substantially eliminated. The communication unit 24 detects the echo or feedback signal via an auxiliary communication path, which is discussed in greater detail with respect to FIG. 2 through FIG. 5.

Figure 2:
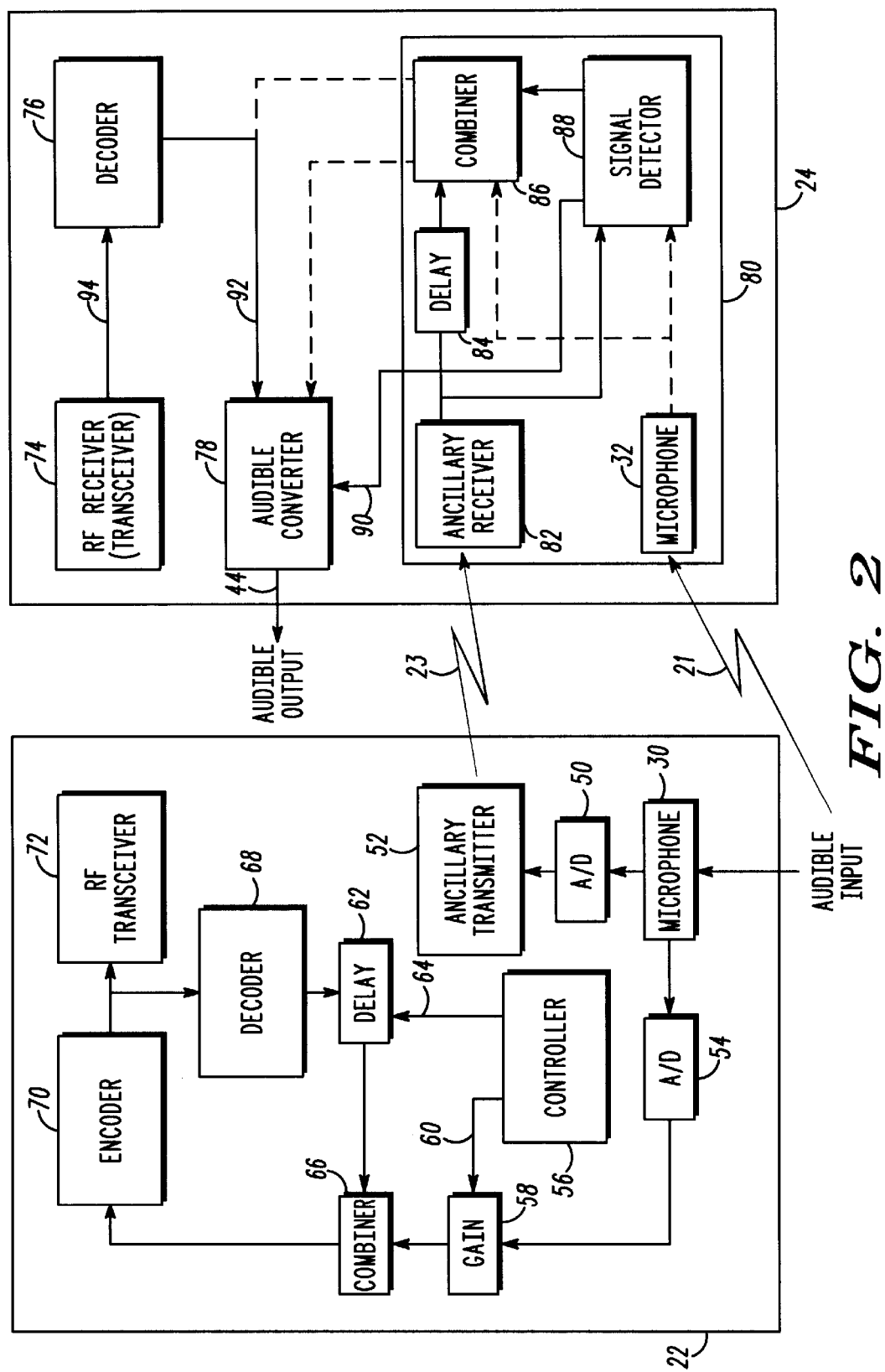
FIG. 2 illustrates a block diagram of receiving and transmitting communication units in accordance with the present invention.

FIG. 2 illustrates a block diagram of a transmitting communication unit 22 and a receiving-communication unit 24. The transmitting communication unit 22 receives an audible input 42 via its microphone 30. The audible input 42 is provided to the receiving communication unit 24 via an ancillary communication path 21 or 23, which may be accomplished through two methods. In the first method, the ancillary communication path 21 is established by the receiving communication unit 24 directly receiving the audible input 42 via its microphone 32. In the second method, the ancillary communication path 23 is established via an ancillary transmitter 42 in the transmitting communication unit 22 and an ancillary receiver 82 in the receiving communication unit 24.

Upon receiving the feedback signal through the microphone 32 its output is applied to a delay circuit 84 and a signal detector 88 within an echo detector 80. The signal detector 88 detects whether the feedback signal exceeds a feedback threshold. Feedback signal detection is performed by estimating the speech power of the received audible input signal. If the speech power compares favorably to a corresponding threshold, the feedback signal is deemed to be present, i.e., the feedback signal exceeds a feedback threshold and an echo condition is detected. For example, if the speech power is below an acceptable power threshold, a no audio feedback condition is detected. Alternatively, if the speech power of the received audible input signal is above a threshold, a feedback condition is detected. If the feedback condition is detected, the signal detector 88 provides an attenuation signal 90 to an audible converter 78, which includes a digital-to-analog converter, as appropriate, and a speaker to produce the audible output 44. Based on the attenuation signal level 90, the audible converter attenuates the audible output 44. Such attenuation may be a fixed rate or a variable rate depending on the estimated speech power. Thus, the greater the detected speech power, the more the audible output 44 is attenuated.

For the ancillary transceiver/receiver communication path, the audible input signal 42 is converted to a digital signal, such as a pulse code modulation (PCM) signal, by an analog-to-digital converter (ADC) 50. The ADC 50 provides the digital signal to the ancillary transmitter 52, which transmits the digital signal, as the feedback signal, to the ancillary receiver 82 of the communication unit 24. The ancillary transmitter 52 is typically a low power transmitter having a transmitting range of a few meters, such a transmitter that utilizes a carrier frequency in the 900 MHz range or another designated low power transmission frequency. Alternatively, a wireline path and/or an analog path may be used as the ancillary path.

Upon receiving the feedback signal, the ancillary receiver 82 provides the signal to a delay circuit 84 and the signal detector 88 within the echo detector 80. The signal detector 88 detects whether the feedback signal exceeds a feedback threshold. Feedback signal detection may also be performed by calculating bit error rate of the received signal and/or by determining the signal strength of the received audible input signal. If the bit error rate or the signal strength compares favorably to a corresponding threshold, the feedback signal is deemed to be present, i.e., the feedback signal exceeds a feedback threshold and an echo condition is detected. For example, if the bit error rate is below an acceptable bit error rate threshold, the signal is deemed to be present. Alternatively, if the signal strength of the received audible input signal is above a threshold, the feedback signal is deemed to be present. If the feedback signal is present, the signal detector 88 provides an attenuation signal 90 to an audible converter 78, which includes a digital-to-analog converter, as appropriate, and a speaker to produce the audible output 44. Based on the attenuation signal 90, the audible converter attenuates the audible output 44. Such attenuation may be a fixed rate or a variable rate depending on the signal strength and/or the bit error rate. Thus, the stronger the feedback signal, the more the audible output 44 is attenuated.

If the receiving communication unit 24 includes echo cancellation functionality, the delay circuit 84 delays the received feedback signal based on the propagation delays of the wireless communication system, e.g., d1+d2+d3. The delayed feedback signal is provided to a combiner 86 along with the decoded original signal 92 which was produced by decoder 76. The decoder 76 may be an IMBE decoder, or vocoder, that converts a digitally encoded original signal 94, which was received via a receiver 74, into the decoded original signal 92. In the preferred embodiment, the receiver is a radio frequency (RF) receiver, such as a two-way radio, cellular telephone, base station, repeater, scanner, and so forth. In the preferred embodiment, the decoded original signal 92 is a PCM signal, while the digitally encoded original signal 94 is an IMBE signal. The combiner 86 combines the delay feedback signal with the decoded original signal 92 to produce an echo-cancelled signal. In the preferred embodiment, the combiner subtracts or cancels the delay feedback signal from the decoded original signal 92 to produce the echo-cancelled signal. The echo-cancelled signal is subsequently provided to the audible converter 78 and is processed to produce the audible output 44. By including such echo cancellation circuitry in the receiving communication unit 24, the echo signals that get propagated through the wireless communication system are substantially reduced.

The transmitting communication unit 22 may include echo communication circuitry. As such, the audible input 42 received by microphone 30 is provided to an analog to digital converter 54. The analog to digital converter 54 converts the audible input signal to a digital signal, such as a PCM audio signal. The digital audio signal is provided to a gain circuit 58 which, based on a gain value 60, attenuates and/or amplifies the digitized audio signal. The gain-adjusted signal is provided to a combiner 66, which receives as its other input a delayed representation of the original signal. The delayed representation of the original signal is produced by encoding via encoder 70 the output of the combiner 66, subsequently decoding the encoded signal by decoder 68, and delaying by the delay circuit 62, the decoded signal by a delay value 64. The encoder 70 may perform an IMBE vocoder encoding process while the decoder 68 may perform a decoding function of the IMBE signal. The encoded signal is provided to the transceiver 72, which subsequently provides the encoded signal to the wireless infrastructure for disbursement to the targeted communication units. In the preferred embodiment, the transceiver 72 is a wireless or RF transceiver.

The controller 56 may obtain the gain value 60 and the delay value 64 from pre-stored data, broadcast data from the wireless infrastructure, or on-the-fly calculated data based on an echo test. Such an echo test includes providing a chirp signal or limited tone signal and detecting the feedback presence to thereby generate the gain value and the delay value.

Figure 3:
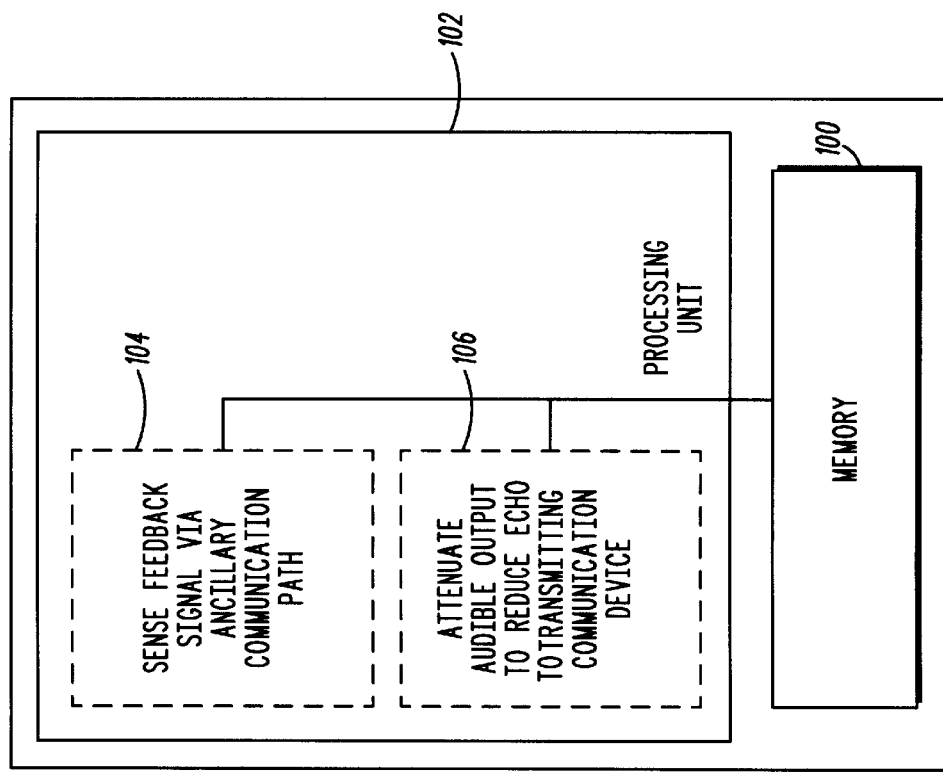
FIG. 3 illustrates an alternate block diagram of a receiving communication unit in accordance with the present invention

FIG. 3 illustrates a block diagram of a receiving communication unit 24. The receiving communication unit 24 includes memory 100 and a processing unit 102. The processing unit 102 may be a microprocessor, micro-controller, digital signal processor, central processing unit, microcomputer, and/or any other-device that manipulates digital information based on programming instructions. The memory 100 may be a read-only memory, random access memory, reprogrammable memory, floppy disk memory, hard disk memory, magnetic tape memory, CD ROM memory, DVD ROM memory, and/or any other device that stores digital information.

Memory 100 stores programming instructions, that, when read by the processing unit 102, causes the processing unit 102 to perform various functions 104 and 106. While reading the programming instructions stored in memory 100, the processing unit 102 senses 104 a feedback signal via an ancillary communication path. This sensing determines whether the receiving communication unit is within proximal limitations of a transmitting communication unit such that an echo signal would be generated. If so, the processing unit 102 attenuates 106 an audible output of the communication unit 24. By attenuating the audible output, the echo received by the transmitting communication unit is substantially reduced. The programming instructions performed by the processing unit 102 will be discussed in more detail with reference to FIG. 5.

Figure 4:
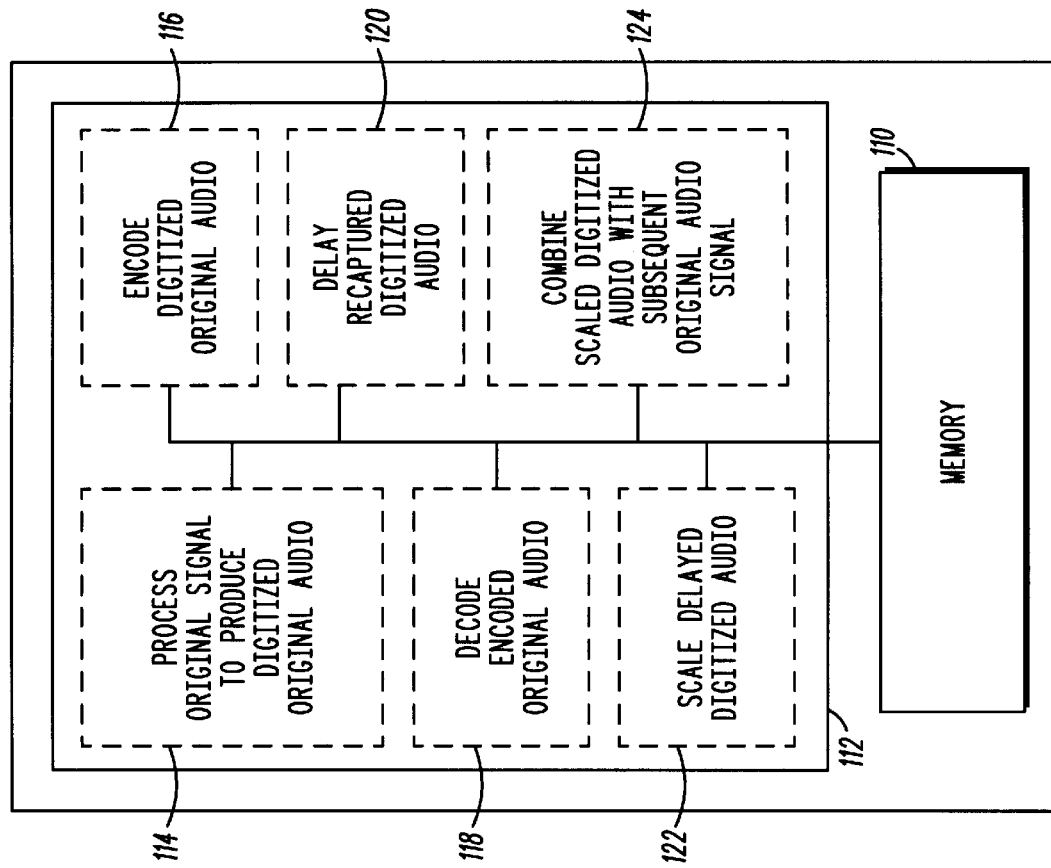
FIG. 4 illustrates an alternate block diagram of a transmitting communication unit in accordance the present invention.

FIG. 4 illustrates a block diagram of a transmitting communication unit 22. The transmitting communication unit 22 includes a processing unit 112 and memory 110. The processing unit 112 may be a microprocessor, micro-controller, digital signal processor, central processing unit, microcomputer, and/or any other device that manipulates digital information based on programming instructions. The memory 110 may be a read-only memory, random access memory, reprogrammable memory, floppy disk memory, hard disk memory, magnetic tape memory, CD ROM memory, DVD ROM memory, and/or any other device that stores digital information.

The memory 110 stores programming instructions that, when read by the processing unit 112, causes the processing unit 112 to perform various functions 114, 116, 118, 120, 122, and 124. While reading the programming instructions the processing unit 112 processes 114 an original signal to produce digitized original audio. The processing unit 112 encodes 116 the digitized original audio to produce an encoded original audio signal. The processing unit decodes 118 the encoded original audio signal to produce a recaptured original audio. The processing unit delays 120 the recaptured digitized audio to produce a delayed digitized audio signal. The processing unit scales 122 the delayed digitized audio to produce a scaled digitized audio signal. The processing unit combines 124 the scaled digitized audio with a subsequent original audio signal to thereby provide echo cancellation within the transmitting communication unit. The programming instructions stored in memory 110 will be discussed in more detail with reference to FIG. 6.

Figure 5:
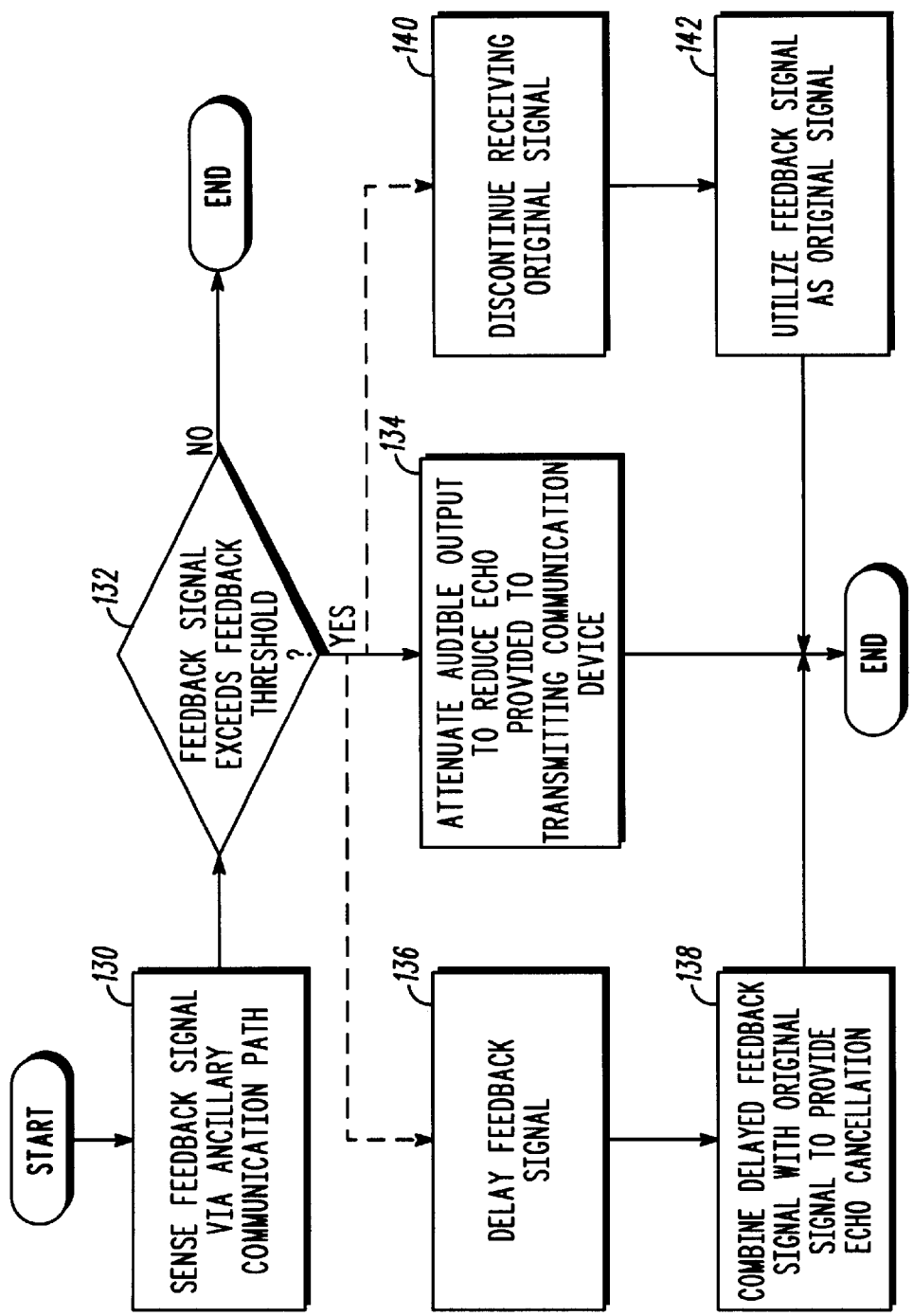
FIG. 5 is a flowchart showing a method of attenuating echo signals in accordance with the present invention.

FIG. 5 is a flowchart showing a method of reducing echo feedback. The process begins at step 130, where a receiving communication unit senses a feedback signal via an ancillary communication path. Note that the feedback signal is a representation of an original signal that is produced as a result of the physical proximity of a transmitting communication unit and the receiving communication unit. Further note that the transmitting communication unit transmits the original signal, via the wireless infrastructure, to the receiving communication unit.

The receiving communication unit may receive the feedback signal via a dedicated ancillary communication path or via the microphone of the receiving communication path. If a dedicated ancillary communication path is provided, the receiving communication unit includes an ancillary receiver while the transmitting communication unit includes an ancillary transmitter. In the preferred embodiment, the ancillary receiver and ancillary transmitter are RF or wireless communication units. Regardless of how the feedback signal is obtained, the process continues with step 132.

At step 132, a determination is made as to whether the feedback signal exceeds a feedback threshold. In other words, a determination is made as to whether the feedback signal is of significant magnitude to cause an echo affect. The determination may be performed by determining that the feedback signal has a bit error rate less than an bit error rate threshold or by determining that the signal strength of the feedback signal is greater than a signal strength threshold. In the preferred embodiment, RF signal strength is measured. If the feedback signal does not exceed a feedback threshold, the process ends for this transmission.

If at step 132 the feedback signal exceeds the feedback threshold, the process continues with step 134, and optionally with steps 136 and 140 simultaneously with step 134. At step 134, an audible output produced by the receiving communication unit is attenuated to reduce the echo provided to the transmitting communication unit. In other words, by reducing the audible output of the receiving communication unit, the originator of the audible input does not hear him or herself via a receiving communication unit that is in a close proximal location.

At step 136, the feedback signal is delayed based on the propagation delay of the communication system. The process continues with step 138 where the delayed feedback signal is combined with the original signal and subsequent original signals to provide echo cancellation within the receiving communication unit. In the preferred embodiment, the delayed feedback signal is subtracted or cancelled from the original signal. By providing echo cancellation within the receiving unit, the propagating effects of echo within a closed communication system is substantially reduced.

At step 140, the receiving communication unit discontinues receiving the original signal. In the preferred embodiment, discontinuing reception of the original signal comprises stopping reception of the original signal, for example, by discontinuing reception on communication resources shared with the wireless infrastructure or the source from which the original signal is received. The process continues with step 142, where the receiving communication unit utilizes the feedback signal as the original signal. At steps 140 and 142, the receiving communication unit is effectively operating in a talk-around mode for this particular transmission. In subsequent transmissions, the receiving communication unit may need to reaffiliate with the wireless infrastructure and make a subsequent determination as to whether it can enter the talk-around mode for the current transmission.

Figure 6:
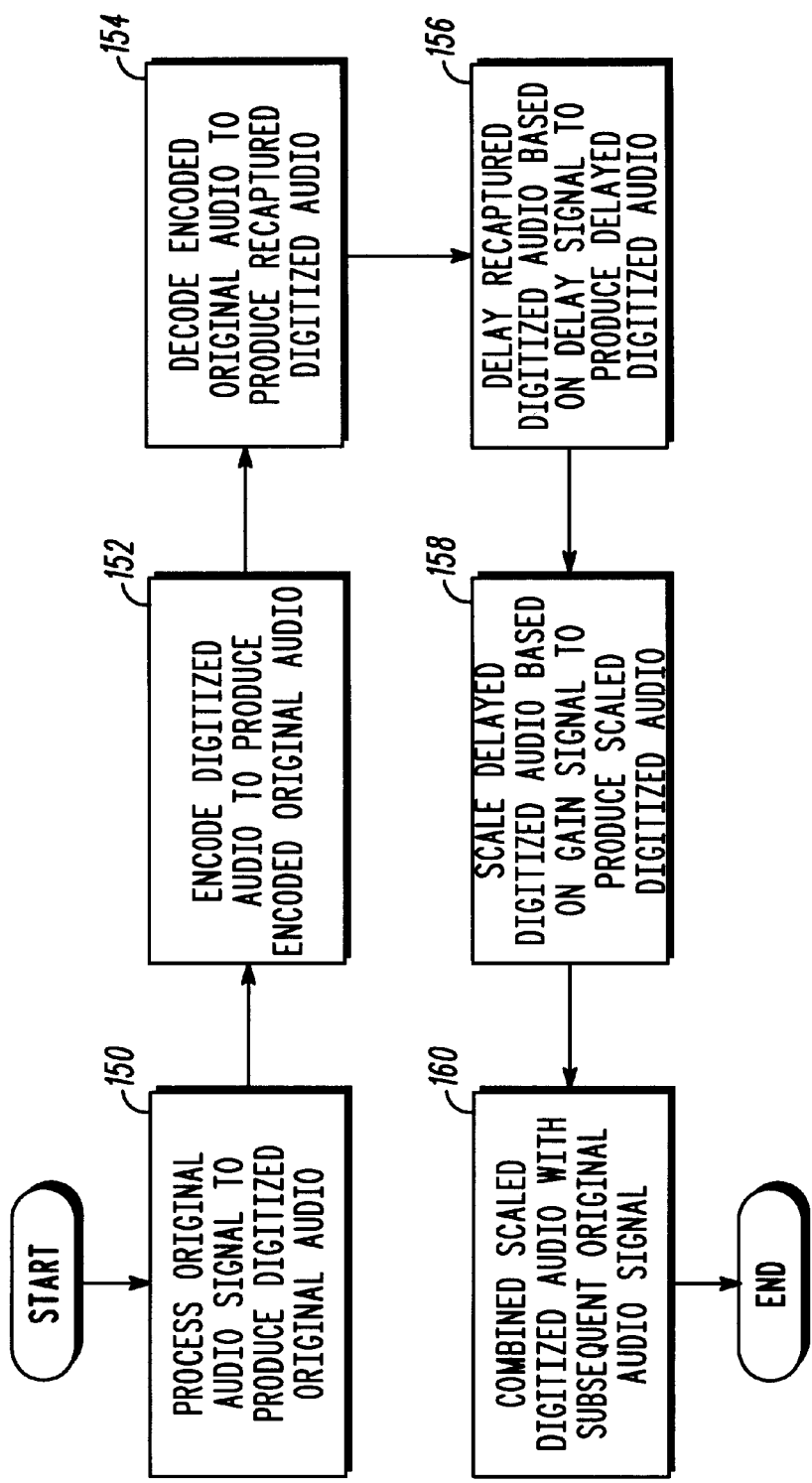
FIG. 6 is a flowchart showing a method of echo cancellation by a transmitter in accordance with the present invention.

FIG. 6 is a flowchart showing a method of a transmitting communication unit providing echo cancellation. The process begins at step 150, where the transmitting communication unit processes an original audio signal to produce digitized original audio. Such processing may include converting the signal to a PCM signal. Having performed the original processing, the process continues with step 152, where the digitized audio is in encoded to produce encoded original audio. In the preferred embodiment, the encoding is performed by using a vocoder such that the PCM digitized audio is converted into an IMBE encoded signal. The process continues with step 154, where the encoded original audio is decoded to produce recaptured digitized audio. In addition, the encoded original audio is provided to a transceiver, which is an RF transceiver in the preferred embodiment, such that a signal is provided to the wireless infrastructure and subsequently routed to targeted communication units.

The process continues with step 156, where the recaptured digitized audio is delayed based on a delayed signal to produce delayed digitized audio. The delay signal may be derived from a preprogrammed delay value and/or an announced delay value by the wireless communication system. The process continues with step 158, where the delayed digitized audio is scaled based on a gain signal to produce scaled digitized audio. The gain signal is derived based on the magnitude of the received feedback signal. The process continues with step 160, where the scaled digitized audio is combined with a subsequent original audio signal to provide the echo cancellation. In the preferred embodiment, the combiner subtracts or cancels the delay feedback signal from the decoded original signal 92 to produce the echo-cancelled signal. Note that the communication unit may also verify that the feedback signal corresponds with the original signal by an identification code verification or signal mapping.

The preceding discussion has presented a method and apparatus for providing echo cancellation within a digital wireless communication system. The echo cancellation may be performed in the transmitting communication unit and/or in the receiving communication unit. In addition to providing echo cancellation, the receiving unit or units that are in close proximal location with the transmitting unit may attenuate their audible outputs to further minimize the feedback effect.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
sensing, by a receiving communication unit of a plurality of communication units, a feedback signal via an ancillary communication path, wherein a transmitting communication unit transmits an original signal to the receiving communication unit, and wherein the feedback signal is representation of the original signal that is produced as a result of physical proximity of the transmitting and receiving communication units; and attenuating, by the receiving communication unit, an audible output to reduce echo to the transmitting communication unit when the feedback signal exceeds a feedback threshold.

2. The method of claim 1, further comprising the step of receiving the feedback signal via an ancillary receiver within the receiving communication unit, wherein the ancillary path is established between the ancillary receiver and an ancillary transmitter within the transmitting communication unit when the ancillary receiver and the ancillary transmitter are within proximal limitations of each other.

3. The method of claim 1, further comprising the step of determining when the feedback signal exceeds the feedback threshold by at least one of determining when a bit error rate of the feedback signal is less than a bit error rate threshold- and determining when a signal strength of the feedback signal is less than a signal strength threshold.

4. The method of claim 1, further comprising the step of receiving the feedback signal via a microphone of the receiving communication unit.

5. The method of claim 1, further comprising the step of combining, by the receiving communication unit, the original signal with a delayed representation of the feedback signal to provide echo cancellation.

6. The method of claim 1, further comprising the steps of:
   discontinue reception of the original signal when the feedback signal is sensed; and
   utilizing the feedback signal as the original signal.

7. The method of claim 1, further comprising the step of verifying that the feedback signal corresponds to the original signal by at least one of identification code verification and signal mapping.

8. A communication unit comprising:
   a receiver operably coupled to receive a digitally encoded original signal from a transmitting communication unit;
   a decoder operably coupled to the receiver, wherein the decoder decodes the digitally encoded original signal to produce a decoded original signal;
   an audible converter operably coupled to the decoder, wherein the audible converter converts the decoded original signal into an audible signal, wherein the audible signal is attenuated based on an attenuation signal; and
   an echo detector, operably coupled to the audible converter, wherein the echo detector detects a feedback signal via an ancillary communication path, generates the attenuation signal based on the feedback signal, and provides the attenuation signal to the audible converter, wherein the feedback signal is representation of the digitally encoded original signal that is produced as a result of physical proximity of the transmitting communication unit and the communication unit.

9. The communication unit of claim 8, further comprising an ancillary receiver that receives the feedback signal, wherein the ancillary communication path is established between the ancillary receiver and an ancillary transmitter within the transmitting communication unit when the ancillary receiver and the ancillary transmitter are within proximal limitations of each other.

10. The communication unit of claim 8, further comprising a signal detector operably coupled to detect presence of the feedback signal, wherein the signal detector detects the presence of the feedback signal based on at least one of bit error rate of the feedback signal being less than a bit error rate threshold and signal strength of the feedback signal being less than a signal strength threshold.

11. The communication unit of claim 8, further comprising a combiner that combines the original decoded signal with a delayed representation of the feedback signal to provide echo cancellation.

12. A communication unit comprising:
   a processing unit; and
   memory operably coupled to the processing unit, wherein the memory stores programming instructions that, when read by the processing unit, cause the processing unit to sense a feedback signal via an ancillary communication path, wherein a transmitting communication unit transmits an original signal to the receiving communication unit, and wherein the feedback signal is representation of the original signal that is produced as a result of physical proximity of the transmitting and receiving communication units; and to attenuate an audible output to reduce echo to the transmitting communication unit when the feedback signal exceeds a feedback threshold.

13. The communication unit of claim 12, arranged and constructed to receive the feedback signal via an ancillary receiver, wherein the ancillary path is established between the ancillary receiver and an ancillary transmitter within the transmitting communication unit when the ancillary receiver and the ancillary transmitter are within proximal limitations of each other.

14. The communication unit of claim 12, arranged and constructed to determine the feedback signal exceeds the feedback threshold by at least one of determining when bit error rate of the feedback signal is less than a bit error rate threshold and determining when signal strength of the feedback signal is less than a signal strength threshold.

15. The communication unit of claim 12, arranged and constructed to combine the original signal with a delayed representation of the feedback signal to provide echo cancellation.

16. The communication unit of claim 12, arranged and constructed to:
   discontinue reception of the original signal when the feedback signal is sensed; and
   utilize the feedback signal as the original signal.

17. The communication unit of claim 12, arranged and constructed to verify that the feedback signal corresponds to the original signal by at least one of identification code verification and signal mapping.

* * * * *